US008994337B2

(12) United States Patent
Kim

(10) Patent No.: US 8,994,337 B2
(45) Date of Patent: Mar. 31, 2015

(54) BALANCING METHOD AND BALANCING SYSTEM OF BATTERY PACK

(75) Inventor: Jae-Won Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 726 days.

(21) Appl. No.: 13/181,433

(22) Filed: Jul. 12, 2011

(65) Prior Publication Data

US 2012/0161707 A1  Jun. 28, 2012

(30) Foreign Application Priority Data

Dec. 28, 2010  (KR) ........................ 10-2010-0136810

(51) Int. Cl.
*H04J 7/00* (2006.01)
*H02J 7/00* (2006.01)

(52) U.S. Cl.
CPC .................................. *H02J 7/0016* (2013.01)
USPC ......................................... 320/136; 320/122

(58) Field of Classification Search
CPC .... H02J 7/0016; H02J 7/007; H02J 2007/005
USPC .................. 320/118, 119, 122, 125, 132, 136
See application file for complete search history.

(56) References Cited

U.S. PATENT DOCUMENTS

| 2009/0096420 | A1* | 4/2009 | Lupu et al. ..................... 320/122 |
| 2010/0085009 | A1 | 4/2010 | Kang et al. |
| 2010/0188047 | A1 | 7/2010 | Liu et al. |
| 2010/0194339 | A1 | 8/2010 | Yang et al. |

FOREIGN PATENT DOCUMENTS

| JP | 2009-159768 A | 7/2009 |
| KR | 10-2010-0019256 A | 8/2010 |
| KR | 10-2010-0089768 A | 8/2010 |

OTHER PUBLICATIONS

Korean Office Action dated Feb. 14, 2012 for Korean Patent Application No. KR 10-2010-0136810 which corresponds to captioned U.S. Appl. No. 13/181,433.

* cited by examiner

*Primary Examiner* — Edward Tso
*Assistant Examiner* — Aaron Piggush
(74) *Attorney, Agent, or Firm* — Knobbe Martens Olson & Bear LLP

(57) ABSTRACT

A balancing method and balancing system of a battery pack is disclosed. The method includes and the system is capable of determining whether a voltage change of the battery pack is greater than a threshold during a charging or discharging period, and balancing the battery cells based on the voltage change being greater than a threshold.

7 Claims, 6 Drawing Sheets

BALANCING METHOD AND BALANCING SYSTEM OF BATTERY PACK

CROSS-REFERENCE TO RELATED APPLICATION

This application claims priority to and the benefit of Korean Patent Application No. 10-2010-0136810 filed in the Korean Intellectual Property Office on Dec. 28, 2010, the entire contents of which are incorporated herein by reference.

BACKGROUND

1. Field

The disclosed technology relates to a balancing method of a battery pack and a battery cell balancing system.

2. Description of the Related Technology

In general, a portable electronic device such as a portable laptop computer and a portable machine tool has a battery pack that is capable of being recharged. Each battery cell of the battery pack has a capacity deviation caused by various steps during a manufacturing process. Accordingly, the battery pack generates a deviation for the charge and discharge voltages of each battery cell in charge and discharge cycles. Therefore, in the battery pack, some battery cells may be overcharged during charge, and some battery cell may be over-discharged during discharge. As described above, the overcharge or over-discharge of the battery cells reduces the capacity of the battery pack, deteriorates the battery pack, and decreases the cycle-life of the battery pack.

Accordingly, cell balancing for controlling a voltage difference between battery cells to be in a permissible range or to be the same in a battery pack is important. In a conventional balancing method, a balancing operation is executed if the voltage difference between the cells is generated after charging. However, when using this method, balancing is possible in a short time in a small capacity battery pack, but balancing is impossible within the same short time in a large capacity battery pack. For example, when a voltage difference of 100 mV between the cells is generated in a large capacity battery pack including 50 A cells, if a balancing current of 300-500 mA is used, the balancing must be executed for more than about 10 minutes for the balancing effect. Meanwhile, if the balancing current is increased to reduce the balancing time, power dissipation is not only increased, but also heat is increased in the battery pack and stress is applied to the elements thereof. The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

One inventive aspect is a method of balancing a battery pack including a plurality of battery cells. The method includes determining whether a current period is a high voltage change period during which a change of a voltage of the battery cells during charging or discharging the plurality of battery cells is larger than a threshold or is a low voltage change period during which the change is less than the threshold. The method also includes starting balancing based on an imbalance between the plurality of battery cells when the plurality of battery cells are in the high voltage change period, and maintaining the balancing if a balancing accumulation time of the plurality of cells is less than a determined balancing time when the plurality of battery cells are in the low voltage change period.

Another inventive aspect is a balancing system of a battery pack. The system includes a voltage sensing and balancing circuit configured to measure a voltage of each battery cell of a battery pack and to provide a balancing current path for each battery cell, and a control unit including a system configured to determine whether a current period is a high voltage change period during which a change of a voltage of the battery cells during charging or discharging of the battery cells is more than a threshold or a low voltage change period during which the change is less than the threshold. The control unit also includes a system configured to select a balancing object cell in a case of a high voltage change period, a system configured to calculate a balancing time for the balancing object cell, a system configured to determine a balancing time in a case of the evenness period, a system configured to determine a comparison of the balancing time in a case of the evenness period, and a system configured to perform a cell balancing operation.

Another inventive aspect is a method of balancing a battery pack including a plurality of battery cells. The method includes determining whether a voltage change of the battery cells is greater than a threshold during a charging or discharging period, and balancing the battery cells based on the voltage change being greater than a threshold.

Another inventive aspect is a balancing system of a battery pack, including a voltage sensing and balancing circuit configured to measure a voltage of each battery cell of a battery pack and to provide a balancing current path for each battery cell, and a control unit. The control unit includes means for determining whether a current period is a high voltage change period during which a change of a voltage of the battery cells during charging or discharging of the battery cells is more than a threshold or a low voltage change period during which the change is less than the threshold, means for selecting a balancing object cell in a case of a high voltage change period, means for calculating a balancing time for the balancing object cell, means for determining a predetermination of a balancing time in a case of the evenness period, means for determining a comparison of the balancing time in a case of the evenness period, and means for executing a cell balancing operation.

DETAILED DESCRIPTION OF CERTAIN INVENTIVE EMBODIMENTS

The advantages and features of certain aspects, and methods of achieving them, are clearly understood by way of the exemplary embodiments described in detail with reference to the accompanying drawings. As those skilled in the art would realize, the described embodiments may be modified in various ways, without departing from the spirit or scope of the present invention. The exemplary embodiments disclosed in this detailed description are only for enhancement of understanding, and it is to be understood that the invention is not limited to the disclosed embodiments, but, on the contrary, is intended to cover various modifications and equivalent arrangements. Accordingly, in various exemplary embodiments, well-known processes, well-known elements, and well-known techniques may not be explained in detail. Although not specifically defined, all of the terms including the technical and scientific terms used herein have meanings understood by persons of ordinary skill in the art. The terms have specific meanings coinciding with related technical references and the present specification as well as lexical meanings. That is, the terms are not to be construed as ideal or formal meanings. Throughout the specification and claims which follow, unless explicitly described to the contrary, the word "comprise/include" or variations such as "comprises/includes" or "comprising/including" will be understood to imply the inclusion of stated elements but not the exclusion of any other elements. The terms of a singular form may include plural forms unless referred to the contrary.

Figure 1:
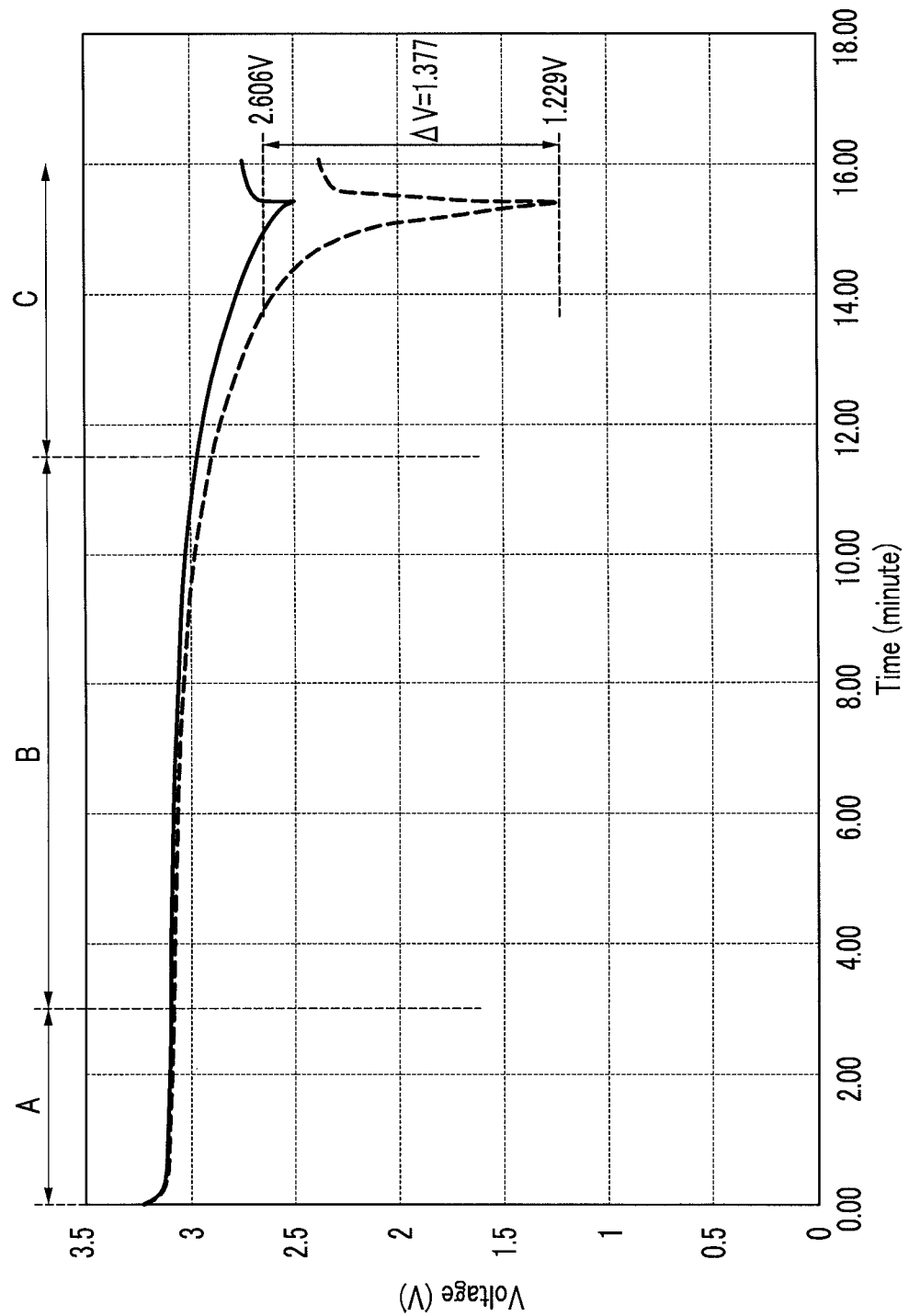
FIG. 1 is a discharge graph of a battery pack.

FIG. 1 is a discharge graph of a battery pack. FIG. 1 shows curves of a cell having a maximum voltage and a cell having a minimum voltage after 1 discharge cycle after discharging a battery pack including 56 cells.

Referring to FIG. 1, after the discharge cycle of the battery pack, the maximum voltage is 2.606V and the minimum voltage is 1.229V, and the difference between maximum and minimum is 1.377V. Although this battery pack has a voltage difference between the cells of 10 mV at an initial configuration, the voltage difference has greatly deviated compared with the initial value after the discharge cycle. From FIG. 1, it may be seen that it may not be helpful to balance according to the measured voltage difference between the cells in the middle period B of the discharge during which the voltages are not very different. Although not shown in the drawing, this may be the same as in the case of charging. A balancing method may take advantage of this characteristic. A balancing operation may be started by selecting a balancing object cell and determining a balancing condition during a period of relatively high voltage change, such as the initial period and the final period of the charging curve and the discharging curve. In these periods, the voltage difference or the capacity difference are relatively high.

Figure 2:
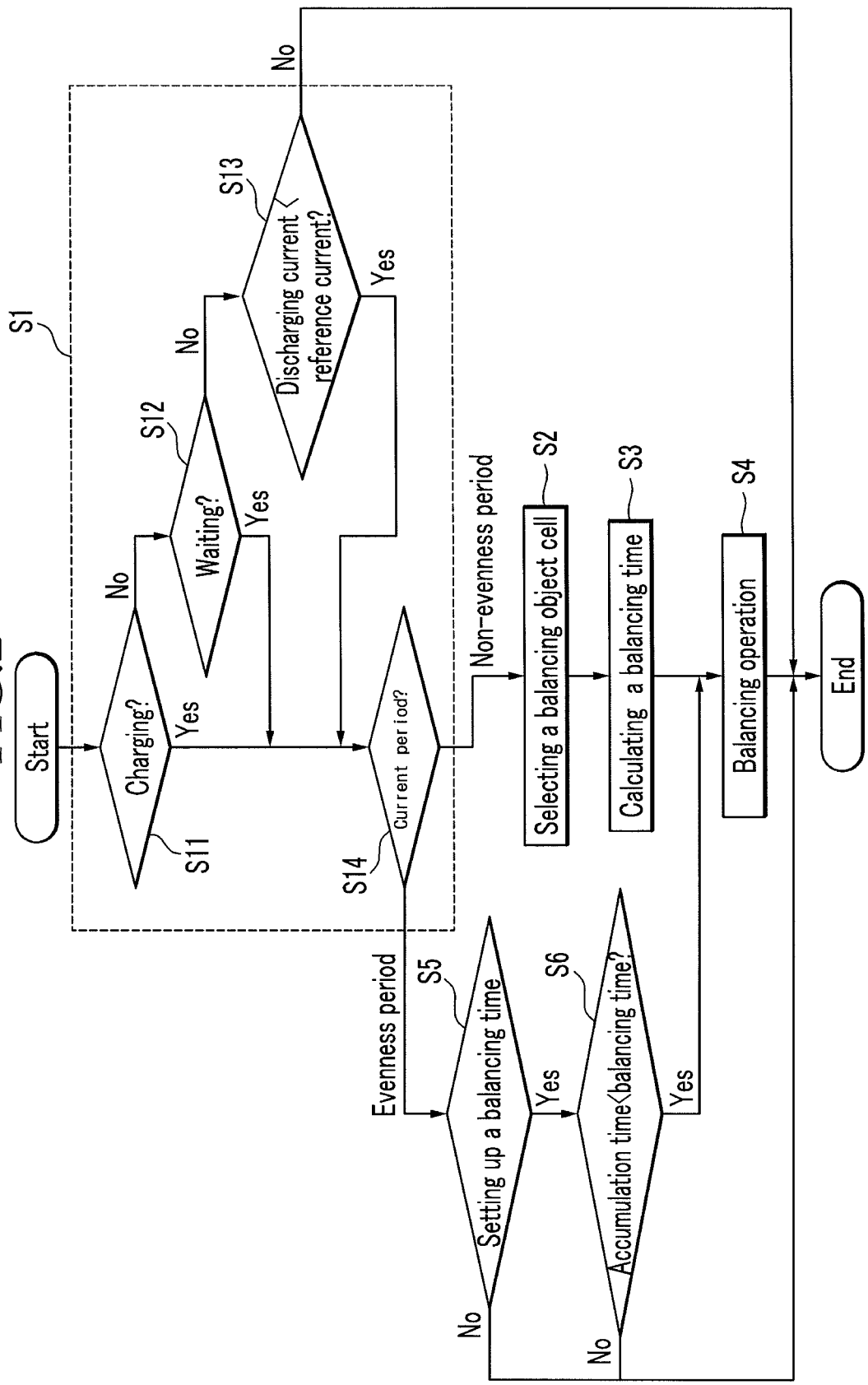
FIG. 2 is a flowchart of a balancing method according to an exemplary embodiment.

FIG. 2 is a flowchart of a balancing method according to an exemplary embodiment. Referring to FIG. 2, the balancing method includes a balancing condition decision step S1.

In the balancing condition decision step S1, a step S11, a step S12, and a step S13 are executed, where step S12 and S13 are conditionally executed, and then a step S14 is executed. The step S11 includes determining whether the charging is executed. The step S12 includes determining whether waiting is executed. The step S13 includes determining whether a discharge current is smaller than a reference current. The step S14 includes determining the current period. The reference current may be changed according to the capacity or the characteristics of the battery pack. Also, the reference current is to be a current that is capable of indicating whether the battery pack is not connected to an external load and is in an open circuit voltage (OCV) state. When the battery pack is not undergoing charge or discharge, is not in the wait period, and is not discharged with a current less than the reference current; the cell balancing is not executed. This is so that the balancing is not executed in the case that the load is connected such that the battery pack is discharged. The sequence of each decision steps is not limited to the above described sequence, and the various other sequences may be practiced.

The step 14 of determining the current period includes determining whether the process is in the cell balancing period. In detail, this step includes determining whether the battery cell is a high voltage change period or a low voltage change period. The high voltage change period may be defined as a period in which the change of the opening voltage OCV of the battery cell for a state of charge (SOC) of the battery cell is more than a threshold, and the low voltage change period may be defined as a period in which the change is less than the threshold. The threshold may be changed according to the capacity or the characteristics of the battery pack.

The method of the decision may be executed by sampling the voltage change of the cell during a time and then setting up the period in which the voltage change amount is more than the threshold as the high voltage change period and the period that it is less than the threshold as the low voltage change period. For example, as shown in the balancing timing diagram of FIG. 3, the period of decision is executed by sampling the voltage of each cell several times with a predetermined sampling cycle 1S. If the voltage change is more than the threshold in the sampling cycle 1S, the period is determined to be the high voltage change period, and if the voltage change is less than the threshold, the period is determined to be the low voltage change period. For example, the threshold may be set to 30 mV, however this may be changed according to the time interval of the sampling period and the capacity or the characteristics of the battery pack.

Figure 3:
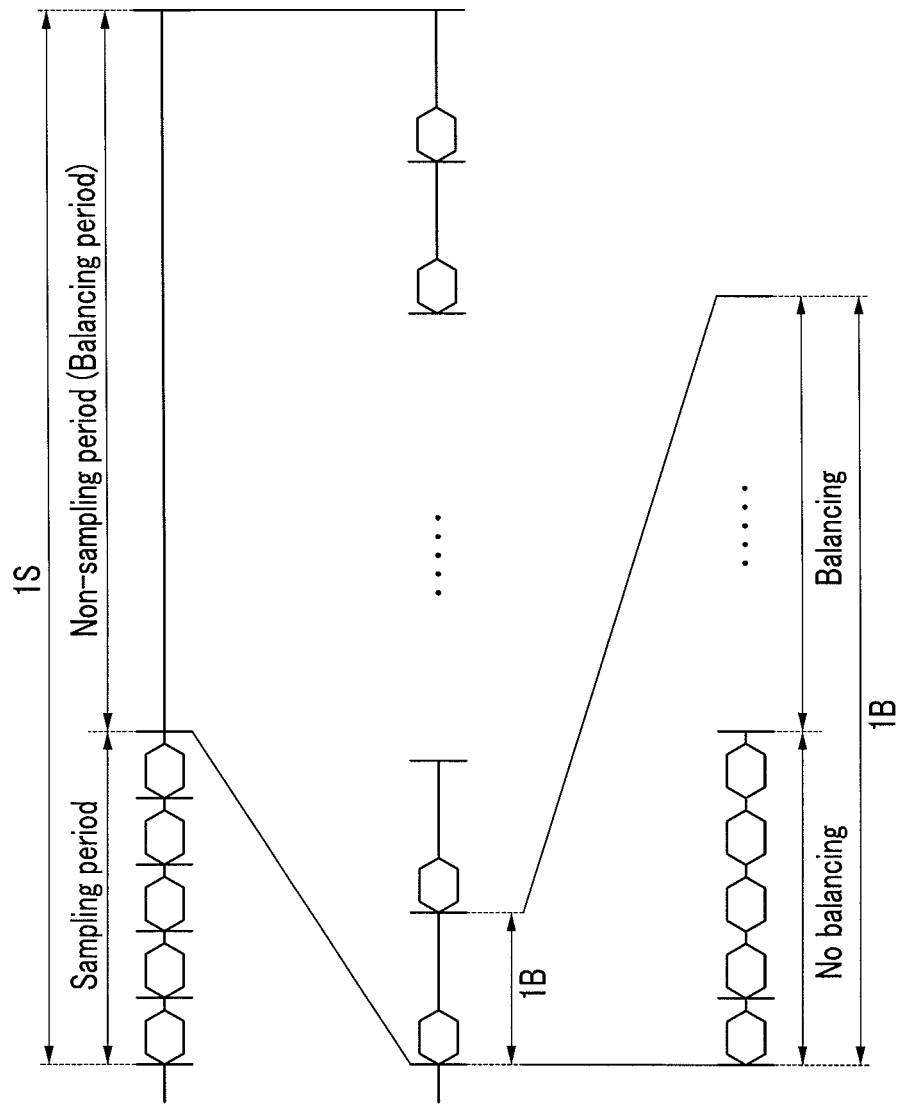
FIG. 3 is a balancing timing diagram according to an exemplary embodiment.

As shown in FIG. 3, the sampling cycle 1S is divided into the sampling period and the non-sampling period. The sampling period may include an offset sampling stage and a voltage sampling stage. In the offset sampling stage, a zero point of a voltage sensing circuit is adjusted. In the voltage sampling stage, the temperature of the battery pack may be sampled along with the voltage. In the non-sampling period, the balancing that is described below may be executed. However, this is only one example, and the voltage sampling stage may include the entire sampling period without the non-sampling period. In this case, the timing for the balancing may be additionally determined. Also, to reduce the load of the sampling, the voltage may be measured only at the starting point and the ending point of the sampling cycle 1S and the voltage change amount may be calculated. Also, in the drawing, the sampling is repeated five times, however the repeating of the sampling is not limited thereto. The time or the cycle may be variously adjusted according to the characteristics of the voltage sensing and balancing circuit and the control unit.

Figure 4:
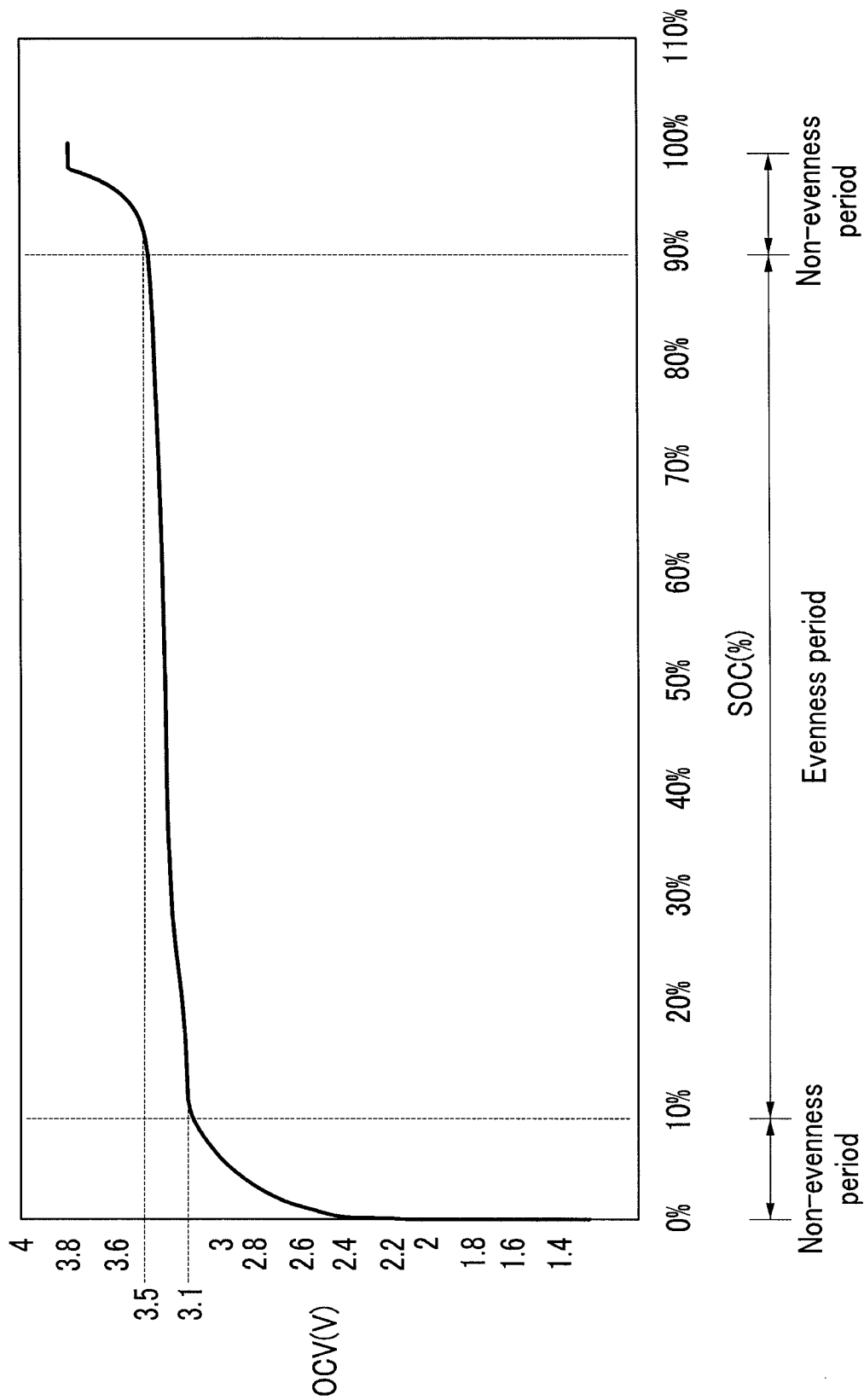
FIG. 4 is a graph showing period appointment according to another exemplary embodiment.
Figure 5:
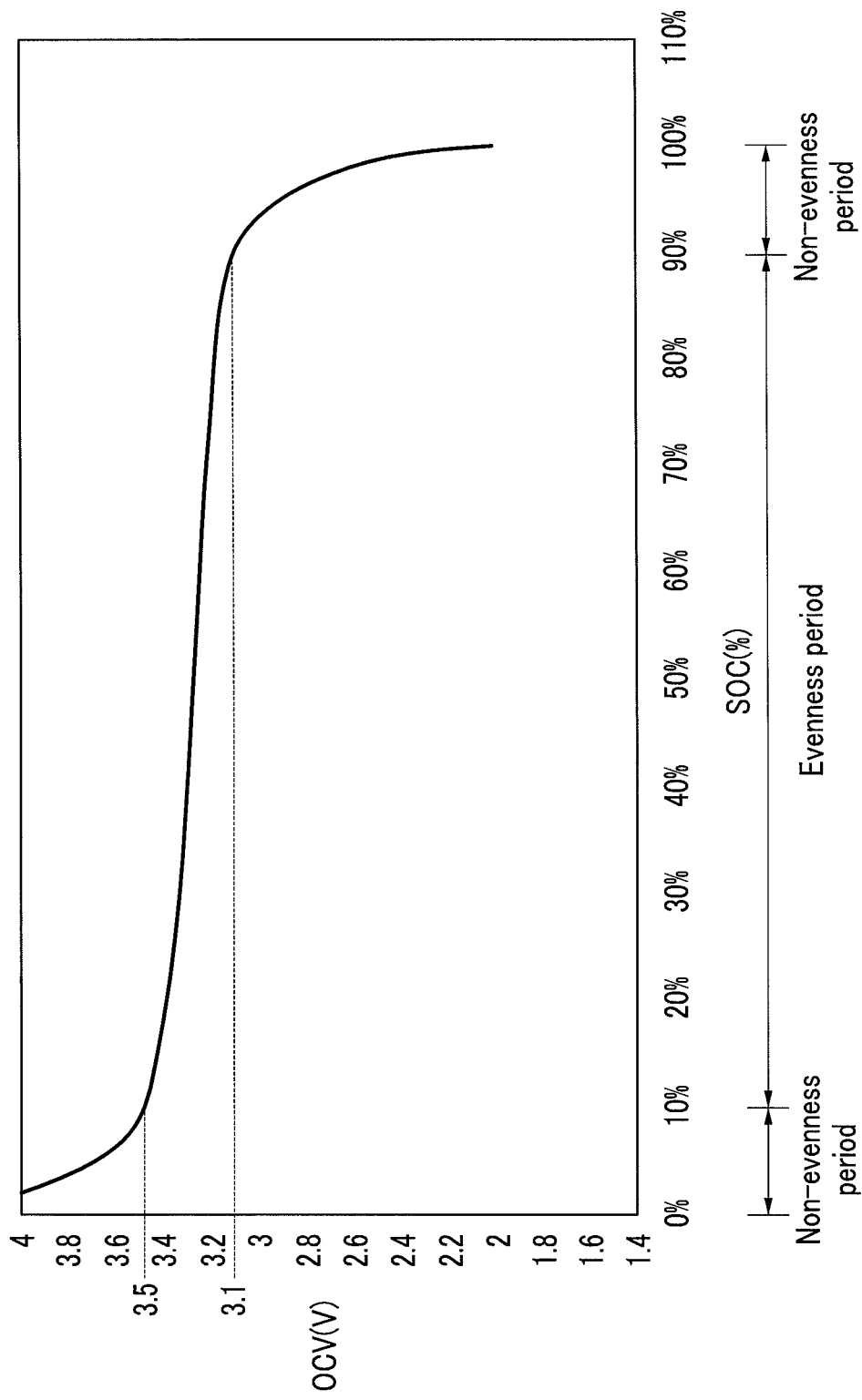
FIG. 5 is a graph of period appointment according to another exemplary embodiment.

Alternatively, the current period may be determined with the range of the OCV of the cell after understanding the charge and discharge characteristics of the battery pack. For example, the charging and discharging characteristic curve (OCV vs. SOC) of the battery pack may be divided into a first period, a second period of a voltage range that is higher than the voltage range of the first period, and a third period of a voltage range that is higher than the voltage range of the second period, and the second period is appointed as the low voltage change period and the first and third periods are appointed as the high voltage change periods. For example, as shown in FIG. 4 and FIG. 5, the periods in which the OCVs are 2.5-3.1V and 3.5-3.7V are appointed as the high voltage change periods and the period in which it is 3.1-3.5V is appointed as the low voltage change period. Accordingly, the current period may be understood by measuring the OCV for the sampling cycle and comparing it with the appointment range. The above-described values may be changed according to the capacity of the battery pack or the charging and discharging characteristics.

As another method for the determining the current period, the current period may be determined with reference to the range of the SOC of the cell after understanding the charging and discharging characteristics of the battery pack. For example, the charging and discharging characteristic curve (OCV vs. SOC) of the battery pack may be divided into a first period, a second period of a higher range than the SOC of the first period, and a third period of a higher range than the SOC of the second period, and the second period is appointed as the low voltage change period while the first and third periods are appointed as the high voltage change periods. For example, as shown in FIG. 4 and FIG. 5, the periods in which the SOC is in the ranges of 0-10% and 90-100% are appointed as the high voltage change period and the period in which it is in the range of 10-90% is appointed as the low voltage change period. Accordingly, the current period may be understood by measuring the SOC for the sampling cycle and comparing the appointment range. The measuring of the SOC may be executed by various methods such as a chemical method, a voltage measuring method, a current integrating method, or a pressure measuring method. The above-described values may be changed according to the capacity of the battery pack and the charging and discharging characteristic.

Again referring to FIG. 2, the process may be changed according to the case of the high voltage change period and the case of the low voltage change period as a result of the balancing condition decision S1. In the case of the high voltage change period, the balancing is started based on the imbalance between the cells. The balancing is started from the balancing object cell selection step S2. The balancing object cell selection step S2 includes selecting at least one cell other than the minimum voltage cell among the plurality of battery cells. All cells having a high voltage with reference to the minimum voltage cell may be selected, and cells representing a voltage difference of more than a threshold difference compared with the minimum voltage cell may be selected. For example, the cells may be selected by determining whether the voltage of the cells is more or less than about 10-20 mV, for example, about 15 mV different from the minimum voltage cell.

The balancing object cell selection step S2 may be executed by selecting at least one cell other than the minimum capacity cell among the plurality of battery cells. All cells having a high capacity with reference to the minimum capacity cell may be selected, and cells representing a capacity difference of more than a threshold capacity difference compared with the minimum capacity cell may be selected. For example, the cells may be selected by determining whether the capacity of the cell is more or less than about 15-45 mAh, for example, about 30 mAh different from the minimum capacity cell. The above-described values may be changed according to the capacity of the battery pack or the charging and discharging characteristics.

Next, the balancing time is calculated (S3). The balancing time is calculated based on the voltage difference between the minimum voltage cell and the selected cells or the capacity difference between the minimum capacity cell and the selected cells to be the same voltage or the same capacity as the minimum voltage cell or the minimum capacity cell. For example, the balancing time may be calculated by using the equation below.

balancing time=capacity difference/balancing current

Next, in the balancing operation step S4, a predetermined balancing current flows in the selected battery cell or battery cells during the calculated balancing time. That is, the selected battery cell or battery cells are discharged during the calculated balancing time for the remaining voltage or capacity of the selected battery cell or battery cells to be the same as the minimum voltage or capacity.

As shown in FIG. 3, this balancing operation step S4 is not continuously executed, but may be repeated during a balancing cycle 1B. The balancing cycle 1B may be executed with a shorter cycle than the sampling cycle 1S for the balancing condition decision. As shown in FIG. 3, a no-balancing period including the offset sampling stage and the temperature and voltage sampling stage and a balancing period for actually discharging the battery cell may be included for each balancing cycle 1B.

In the offset sampling stage, the zero point of the voltage sensing circuit is adjusted. In the temperature and voltage sampling stage, the temperature of the battery pack and the voltage of each battery cell are sampled such that it is determined whether the load, for example, a portable machine tool, is operated among the balancing operation step S4.

When the load is connected such that the battery pack is discharged, the battery balancing operation step S4 is stopped to maintain stable output of the battery pack. When the discharge of the battery pack is completed, the balancing operation step S4 is again executed.

That is, in the balancing method according to an exemplary embodiment, if it is determined to balance the battery cell under the balancing condition decision, the balancing state is maintained until the next sampling cycle 1S occurs. Even though the no-balancing period and the balancing period are continuously repeated for each balancing cycle 1B, they are only repeated under the balancing condition that is previously determined. If the balancing operation step S4 is repeated and the next sampling cycle 1S occurs, the balancing condition decision step S1 is again started. The sampling cycle 1S and the balancing cycle 1B may be variously controlled according to the capacity of the battery pack, the charging and discharging characteristics, the voltage sensing, and the characteristics of a balancing circuit 20 or a control unit 630.

Meanwhile, when the result of the balancing condition decision S1 is the low voltage change period, the algorithm is set up for the predetermined balancing operation to be maintained in the high voltage change period. As shown in FIG. 3, the balancing time decision step S5 may be firstly executed. The balancing time only exists in the case that the balancing time calculation step S3 is executed in the previous high voltage change step. That is, when the balancing time calculation step S3 is executed in the previous cycle, the balancing time (discharge time) is stored in the memory, and the control unit reads the balancing time stored in the memory to confirm whether the balancing time is set. In the case that the method of the battery cell is executed, the balancing time is not executed in the balancing time decision step S5 such that the balancing of the battery cell is directly ended.

Next, the balancing time comparison decision step S6 includes determining whether the balancing accumulation time of the battery cell is less than the balancing time that is previously determined. If the accumulation time is less than the balancing time that is calculated in the balancing time calculation step S3, the balancing operation step S4 is executed. If the accumulation time is equal to or more than the balancing time that is previously determined, the balancing is directly ended.

When "no" is determined in the balancing time decision step S5 or the balancing time comparison decision step S6, the balancing of the battery cell maintains the ending state before the balancing condition decision step S1 of the next cycle.

Figure 6:
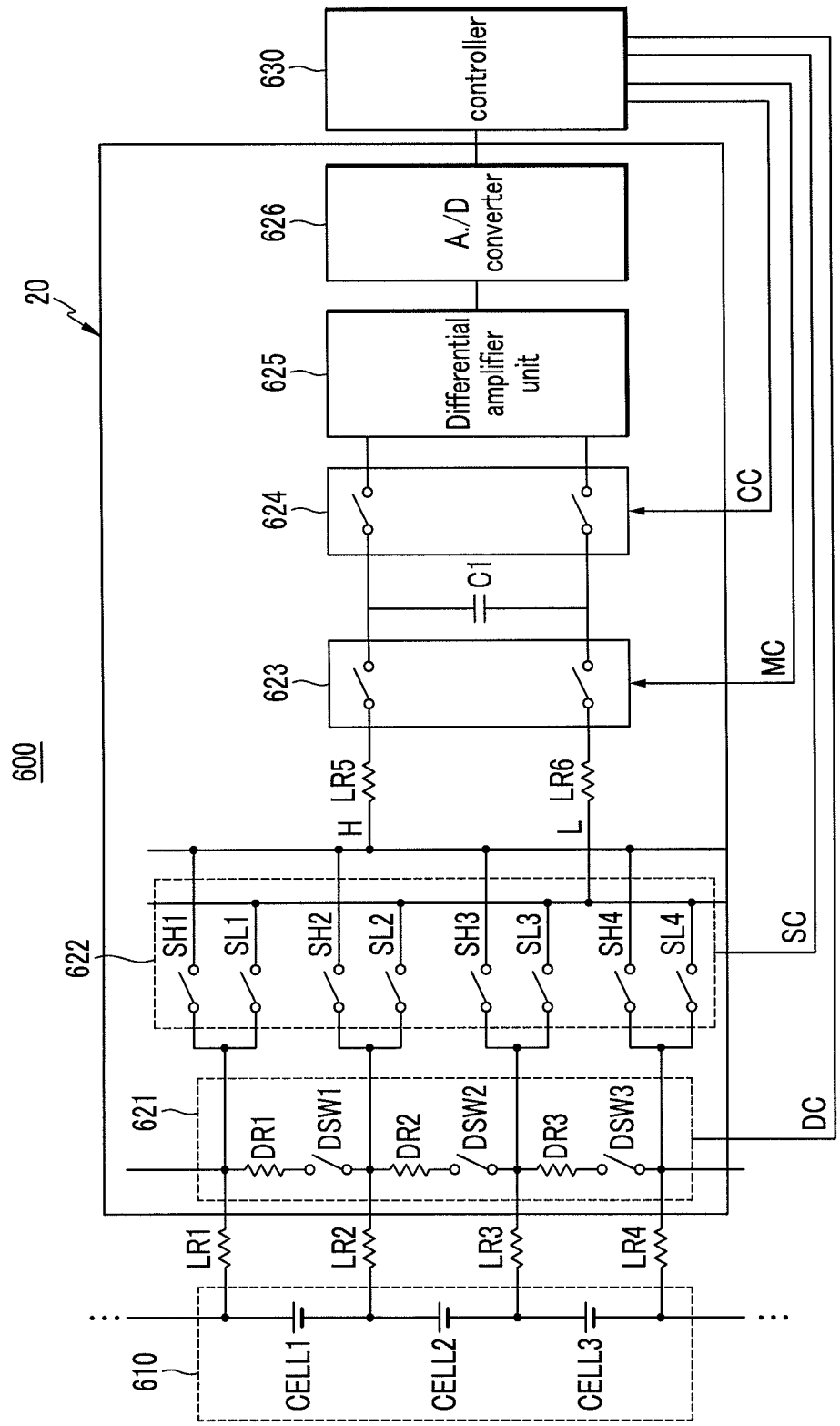
FIG. 6 is a schematic diagram of a balancing system that is capable of performing a balancing method of a battery pack according to exemplary embodiments.

FIG. 6 is a schematic diagram showing a balancing system 600 applied with a balancing method of a battery pack according to exemplary embodiments. The balancing system 600 includes a battery 610 having a plurality of cells, the voltage sensing and balancing circuit 20, and the control unit 630. For better comprehension and ease of description, FIG. 6 shows three cells among the plurality of cells of the battery 610.

The cell balancing unit 621 includes discharge resistors DR1-DR3 and cell balancing switches DSW1-DSW3. The discharge resistors DR1-DR3 and the cell balancing switches DSW1-DSW3 are connected in series between terminals of the cells CELL1-3. The cell balancing switches DSW1-DSW3 are turned on/off according to the discharge controlling signal DC output from the control unit 630.

Line resistances LR1-LR4 indicate internal resistance of the wire positioned between the terminals of the cells CELL1-3 and the discharge resistors DR1-DR3, and line resistances LR5 and LR6 indicate the internal resistance of the wire positioned between the first output terminal H and the first relay unit 623, and the second output terminal L and the first relay unit 623, respectively.

The cell selection unit 622 includes a plurality of cell selection switches SH1-SH4 and SL1-SL4. The plurality of cell selection switches SH1-SH4 and SL1-SL4 are turned on/off according to the selection controlling signal CS output from the control unit 630. For example, when the selection of the first cell CELL1 is needed, a connection controlling signal SC turns on the cell selection switches SH1 and SL2. Thus, the first output terminal H and the second output terminal L are respectively connected to both terminals of the cell CELL1.

A first relay unit 623 transmits the voltage stored in the corresponding cells CELL1-CELL3 to the capacitor C1 according to a measurement control signal MC output from the control unit 630. A second relay unit 624 transmits the voltage stored in the capacitor C1 to a differential amplifier unit 625 according to a connection control signal CC output from the control unit 630.

The capacitor C1 is connected between the first output terminal H and the second output terminal L. The differential amplifier unit 625 amplifies the voltage transmitted from the capacitor C1 according to the gain corresponding to the resistance ratio of at least one resistance member to generate an output voltage, and the generated output voltage is transmitted to an A/D converter 626. The A/D converter 626 converts the output voltage transmitted from the differential amplifier unit 625 to be recognized by the control unit 630 and transmits it to the control unit 630.

To execute the balancing method described with reference to FIG. 1 to FIG. 5, the control unit 630 may include a system for determining the balancing condition according to the result transmitted from the A/D converter 626 S1, a system for selecting the balancing object cell S2, a system for calculating the balancing time S3, a system for executing the cell balancing operation S4, a system for determining the balancing time S5, and a system for comparing and determining the balancing time S6. The system for determining the balancing condition S1 may include a system for determining whether the battery pack is charging or discharging S11, is waiting S12, or is discharged with a current less than the reference current S13, and a system for determining S14 whether the current period. The system for determining whether the current period S14 may include a system for sampling the voltage changing amount of the cells when charging and discharging the plurality of battery cells to confirm whether the current period is the high voltage change period in which the voltage change amount is more than the threshold value. Also, the system for determining whether the current period S14 may include a system for dividing the charge and discharge characteristic curve of the plurality of battery cells into the first period, the second period of the higher voltage range than the first period, and the third period of the higher voltage range than the second period and comparing a reference period storage unit appointing the second period as the low voltage change period and the first and third periods as the high voltage change periods with the voltage of the measured cells and the reference period to confirm whether the current period is the high voltage change period or the low voltage change period. Also, the means for determining whether the current period S14 may include a system for dividing the charge and discharge characteristic curve of the plurality of battery cells into the first period, the second period of the higher range than the SOC of the first period, and the third period of the higher range than the SOC of the second period and comparing an appointment period storage unit appointing the second period as the low voltage change period and the first and the third periods as the high voltage change periods with the capacity of the measured cells and the reference period to confirm whether the current period is the high voltage change period or the low voltage change period. The system for executing the cell balancing operation may include a system for generating the discharge controlling signal DC controlling the turning on of the cell balancing switches DSW1-DSW3. For example, when it is beneficial to execute the cell balancing of the second cell CELL2, the discharge controlling signal DC turns on the cell balancing switch DSW2. Thus, the cell CELL2 is discharged by the current flowing according to the balancing current path formed by the discharge resistor DR2 and the cell balancing switch DSW2. Also, when maintaining the cell balancing, the turn-on state of the cell balancing switch DSW2 is maintained such that the discharge control signal DC that is capable of maintaining the balancing current path is generated.

In the exemplary embodiments described with reference to FIG. 1 to FIG. 6, the method for executing the balancing by discharging the balancing object cell is explained; however the same algorithm may be applied to a case of charging the balancing object cell. When balancing with the charging method, the balancing object cell is selected with reference to the maximum voltage or the maximum capacity cell and the balancing time, that is, the charging time may be set based on the voltage difference or the capacity difference. The charging current may, for example, be input to the selected cell from an external power source, and the charging current may be input from the battery cell in which the charging state is high. The external power source may be a DC to DC converter, but the present invention is not limited thereto.

The voltage difference between the cells may not be large in the low voltage change period such that if the balancing is executed in the case that the voltage difference between the cells is measured in the low voltage change period and the value is larger than the threshold value, for example, 10 mV, it is difficult to select the correct balancing cell and the balancing efficiency is decreased. That is, the burden of consistently tracking the voltage difference between the cells in the low voltage change period as a period that is relatively long compared with the high voltage change period is large and the balancing efficiency is also low. Accordingly, according to the exemplary embodiments, the balancing object cell is selected, the balancing condition is determined, and the balancing operation is started in the high voltage change period such as the initial stage or the final stage of the charging and discharging curve in which the voltage difference or the capacity difference is relatively high such that the balancing cell may be correctly and easily selected. Also, the balancing operation that is determined in the high voltage change period also applies to the evenness period such that sufficient balancing time may be obtained; resultantly an appropriate balancing current may be used compared with the conventional execution of the balancing operation after the charging is finished. Accordingly, the battery pack may not be damaged.

The foregoing embodiments and advantages are merely exemplary and are not to be construed as limiting the present invention. As the exemplary embodiments may be implemented in several forms without departing from the characteristics thereof, it should also be understood that the above-described embodiments are not limited by any of the details of the foregoing description. It should also be understood that the present invention is meant to cover all modifications, similarities, and alternatives. Therefore, various changes and modifications may be practiced.

What is claimed is:

1. A method of balancing a battery pack comprising a plurality of battery cells, the method comprising:
   determining whether a current period is a high voltage change period during which a change of a voltage of the battery cells during charging or discharging the plurality of battery cells is larger than a threshold or is a low voltage change period during which the change is less than the threshold;
   starting balancing based on an imbalance between the plurality of battery cells when the plurality of battery cells are in the high voltage change period; and
   maintaining the balancing if a balancing accumulation time of the plurality of cells is less than a determined balancing time when the plurality of battery cells are in the low voltage change period, wherein the current period being a high voltage change period during which a change of the voltage of the battery cells during charging or discharging the plurality of battery cells is larger than a threshold is determined at a first time, and being a low voltage change period during which the change is less than the threshold is determined at a second time.

2. The method of claim 1, wherein starting the balancing includes:
   selecting at least one cell other than a minimum voltage cell or a minimum capacity cell; and
   calculating a balancing time based on a voltage difference between the minimum voltage cell and the selected cell or a capacity difference between the minimum capacity cell and the selected cell.

3. The method of claim 2, wherein maintaining the balancing further includes:
   determining whether the balancing time is set up; and
   determining whether the balancing accumulation time is less than the determined balancing time.

4. The method of claim 1, wherein determining whether the current period is the high voltage change period or the low voltage change period includes determining the current period as the high voltage change period if the voltage change is greater than the threshold or as the low voltage change period if the voltage change is less than the threshold by sampling the voltage during the charging or discharging of the plurality of battery cells.

5. The method of claim 1, wherein determining the high voltage change period or the low voltage change period comprises:
   dividing a charging or discharging characteristic curve of a plurality of battery cells into a first period, a second period of a voltage range that is higher than a voltage range of the first period, and a third period of a voltage range that is higher than the voltage range of the second period,
   appointing the second period as a low voltage change period and the first and third periods as high voltage change periods, and
   confirming whether the current period is the high voltage change period or the low voltage change period during the charging and discharging of the battery cells.

6. The method of claim 1, wherein determining the high voltage change period or the low voltage change period comprises:
   dividing a charging or discharging characteristic curve of the plurality of battery cells into a first period, a second period of a higher range of an SOC than in the first period, and a third period of a higher range of an SOC than in the second period,
   appointing the second period as the low voltage change period and the first and third periods as the high voltage change periods, and
   confirming whether the current period is the high voltage change period or the low voltage change period by measuring the capacity of the cells during the charging and discharging of the plurality of battery cells.

7. The method of claim 1, further comprising:
   determining when the change of the voltage is no longer greater than the threshold;
   determining the balancing accumulation time; and
   continuing to balance the battery cells if the balancing accumulation time is less than the determined balancing time.

* * * * *